(12) United States Patent
Shin (10) Patent No.: US 9,030,553 B2
(45) Date of Patent: May 12, 2015

(54) PROJECTOR IMAGE CORRECTION DEVICE AND METHOD

(75) Inventor: Ho Chul Shin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 427 days.

(21) Appl. No.: 13/614,981

(22) Filed: Sep. 13, 2012

(65) Prior Publication Data

US 2013/0162814 A1      Jun. 27, 2013

(30) Foreign Application Priority Data

Dec. 26, 2011      (KR) ........................ 10-2011-0142679

(51) Int. Cl.
*H04N 7/18*       (2006.01)
*G09G 5/00*       (2006.01)

(52) U.S. Cl.
CPC ..................................... *H04N 7/18* (2013.01)

(58) Field of Classification Search
CPC ...... G01B 11/022; G01B 11/024; H04N 7/18; H04N 7/181; G01C 15/00
USPC .......................................................... 348/135
See application file for complete search history.

(56) References Cited

U.S. PATENT DOCUMENTS

| | | | | |
|---|---|---|---|---|
| 5,258,830 A * | 11/1993 | Schmidt et al. | ............... | 348/744 |
| 2004/0218069 A1 * | 11/2004 | Silverstein | .................. | 348/239 |
| 2007/0058175 A1 * | 3/2007 | Maierhofer | ................... | 356/601 |
| 2007/0110304 A1 * | 5/2007 | Tsukada | ....................... | 382/167 |
| 2008/0013057 A1 * | 1/2008 | Bullock | ........................ | 353/121 |
| 2008/0095468 A1 * | 4/2008 | Klemmer et al. | ............. | 382/285 |
| 2010/0091112 A1 * | 4/2010 | Veeser et al. | ............... | 348/207.1 |
| 2011/0018897 A1 * | 1/2011 | Uchiyama et al. | ............ | 345/619 |
| 2011/0211064 A1 * | 9/2011 | Furui | ............................ | 348/135 |
| 2012/0182307 A1 * | 7/2012 | Ueno et al. | .................... | 345/589 |
| 2013/0063401 A1 * | 3/2013 | Ouchida | ....................... | 345/175 |

FOREIGN PATENT DOCUMENTS

| | | |
|---|---|---|
| KR | 10-2004-0056489 A | 7/2004 |
| KR | 10-2009-0090682 A | 8/2009 |
| KR | 10-2010-0029285 A | 3/2010 |
| KR | 10-2010-0100058 A | 9/2010 |
| KR | 10-2011-0079444 A | 7/2011 |

* cited by examiner

*Primary Examiner* — Sath V Perungavoor
*Assistant Examiner* — Howard D Brown, Jr.
(74) *Attorney, Agent, or Firm* — Rabin & Berdo, P.C.

(57) ABSTRACT

Disclosed are projector image correction device and method using a range image camera in order to efficiently use a beam projector in an arbitrary environment. In the projector image correction device, range information of a projected surface is determined by using a range image camera to detect a surface shape of the projected surface and determine a surface state such as a color and a material of the projected surface and a state of a surrounding illumination, thereby efficiently correcting an image to be outputted to perform an efficient image output in an arbitrary environment having various colors and materials.

12 Claims, 8 Drawing Sheets

(5 of 8 Drawing Sheet(s) Filed in Color)

PROJECTOR IMAGE CORRECTION DEVICE AND METHOD

CROSS-REFERENCE TO RELATED APPLICATIONS

This application claims priority to and the benefit of Korean Patent Application No. 10-2011-0142679 filed in the Korean Intellectual Property Office on Dec. 26, 2011, the entire contents of which are incorporated herein by reference.

TECHNICAL FIELD

The present invention relates to projector image correction device and method using a range image camera in order to efficiently use a beam projector in an arbitrary environment.

BACKGROUND ART

A projector is a device that projects an image enlarged through a lens onto a screen by receiving signals of various image apparatuses to display the projected image. Since it is difficult for the projector to separately have a large-volume screen, the image is primarily projected to places such as a wall surface, a ceiling, and the like. When the wall surface, the ceiling, and the like which serve as the screen are not flat planes or have a uniform background color, the image seems to be distorted.

SUMMARY OF THE INVENTION

The present invention has been made in an effort to provide projector image correction device and method in which range information of a projected surface is determined by using a range image camera to detect a surface shape of the projected surface and determine a surface state such as a color and a material of the projected surface and a state of a surrounding illumination, thereby efficiently correcting an image to be outputted to perform an efficient image output in an arbitrary environment having various colors and materials.

An exemplary embodiment of the present invention provides a projector image correction device, including: at least one range image camera acquiring a range image for a surface to project an image; an actual image camera photographing the surface to project the image; a range image calculating unit outputting a result of calculating the range image inputted from the range image camera; a surface shape detecting unit acquiring geometric information on an surface to be projected with the image by recognizing the surface shape of the surface to be projected with the image by using the calculated result inputted from the range image calculating unit; a surface state detecting unit reconfiguring an independent irradiation environment image acquired by removing a projection image component of the projector by removing an output image component of the previous screen from the image inputted from the actual image camera to divide the screen for each region through analyzing color and material and analyzing color and material for each region to acquire color and material information; an illumination state detecting unit acquires illumination information of an environment through brightness of the input image inputted from the actual image camera and a gain value of the actual image camera; and an output image correcting unit correcting the output image by using the geometric information, color and material information, and illumination information to output the corrected image.

Another exemplary embodiment of the present invention provides a projector image correction method, including: acquiring a range image for a surface to project an image; acquiring an input image by photographing the surface to project the image; outputting a result of calculating the range image inputted from the range image camera; acquiring geometric information on a surface to be projected with the image by recognizing the surface shape of the surface to be projected with the image by using the calculated result; reconfiguring an independent irradiation environment image acquired by removing a projection image component of the projector by removing an output image component of the previous screen from the input image to divide the screen for each region through analyzing color and material and analyzing color and material for each region to acquire color and material information; acquiring illumination information of an environment through brightness of the input image inputted from the actual image camera and a gain value of the actual image camera; and correcting the output image by using the geometric information, color and material information, and illumination information to output the corrected image.

According to the exemplary embodiment of the present invention, it is possible to output a projector image without distortion even in an arbitrary environment having various colors and materials.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The patent or application file contains at least one sheet of drawings executed in color. Copies of this patent or patent application publication with color drawings will be provided by the Office upon request and payment of the necessary fee.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, projector image correction device and method according to exemplary embodiments of the present invention will be described below with reference to the accompanying drawings.

With emergence of mobile devices such as a smart phone and small-sized projectors, a need to use projectors is increasing in various environments, but a screen with a flat plane and a uniform background color is required for an existing projector in order to efficiently output an image.

Figure 1:
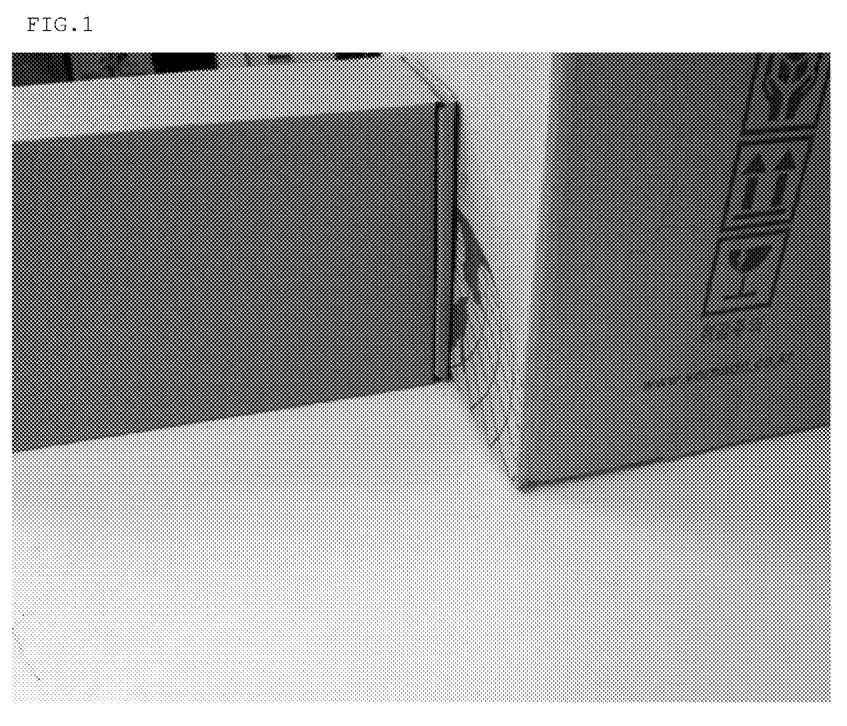
FIG. 1 is a photograph showing an example of an arbitrary projection environment, not a planar screen.
Figure 2:
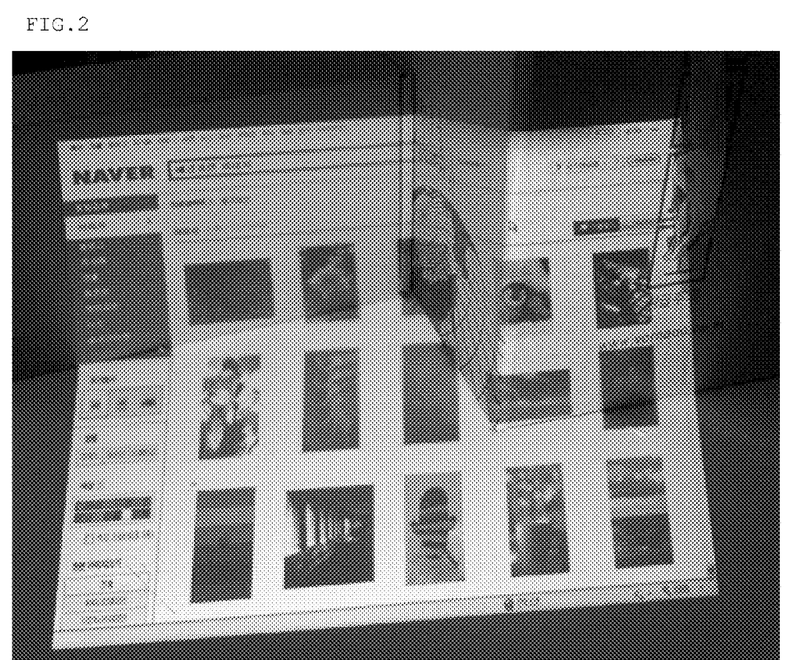
FIG. 2 is a photograph showing an example of a result in which an existing image output is performed for an arbitrary projection environment.

As illustrated in FIG. 1, in the case where an image is projected by using a projector in an environment with a flat plane and an ununiform background color, as illustrated in FIG. 2, a result of an image of which color and shape are distorted cannot help but be outputted. Accordingly, in order to solve the problem, the image needs to be outputted by recognizing an image output environment and performing a proper correction, and a geometric correction for a surface shape, a color correction for surface material and color, a brightness correction for an illumination condition, and the like are required.

Figure 3:
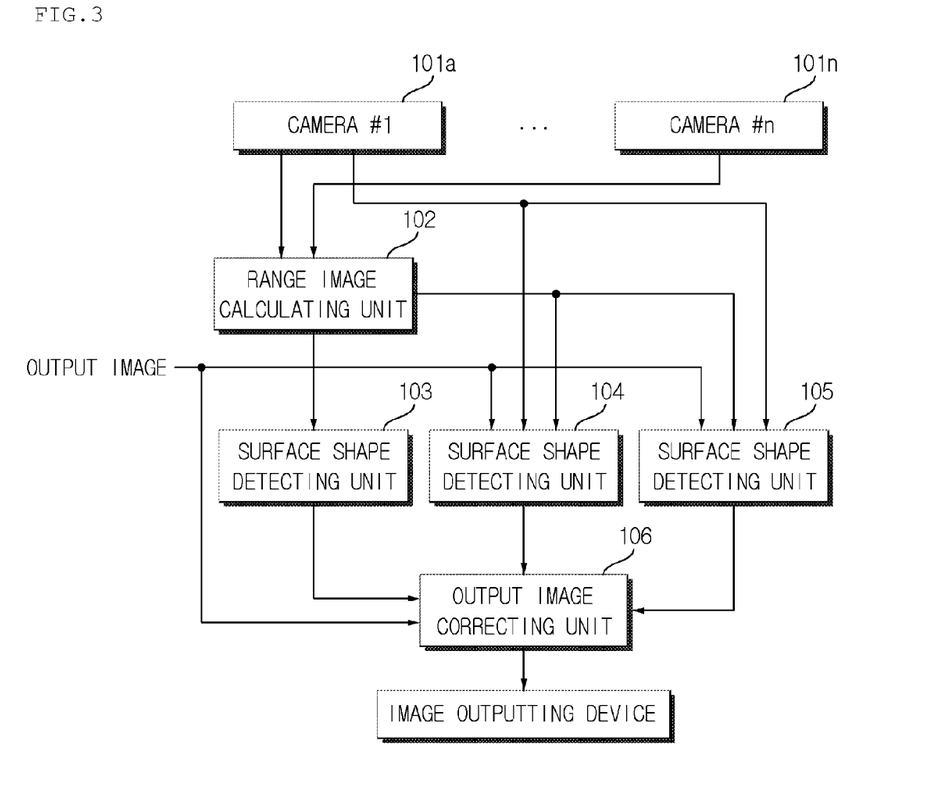
FIG. 3 is a block diagram illustrating a projector image correction device according to the present invention.
Figure 4:
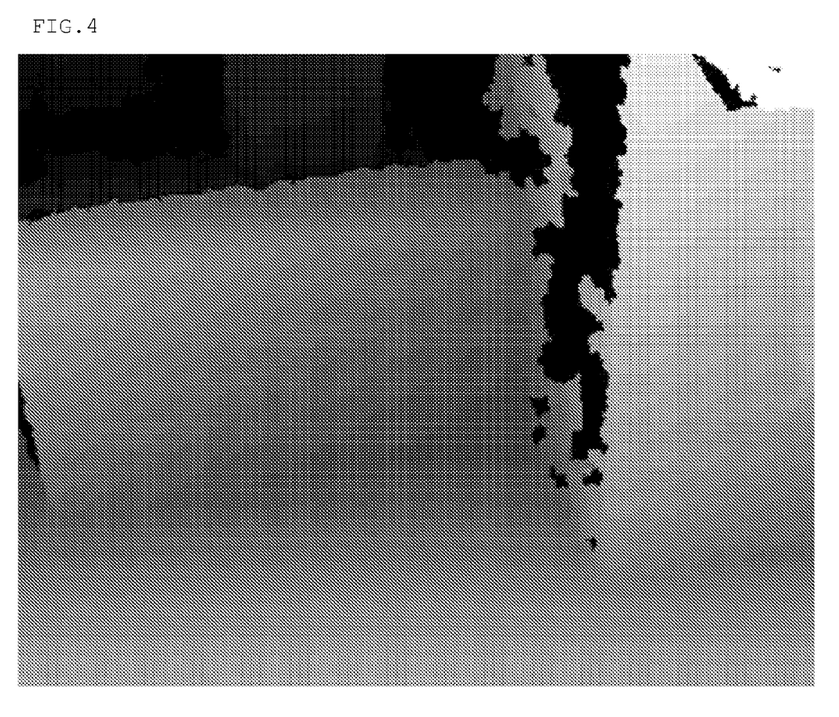
FIG. 4 is a diagram illustrating an example of a result in which range image information for an arbitrary projection environment is acquired by using a range image camera according to the present invention.

Therefore, in the present invention, a projector image correction device having a configuration illustrated in FIG. 3 is proposed.

Referring to FIG. 3, a projector image correction device according to an exemplary embodiment of the present invention includes first to n-th cameras 101a to 101n, a range image calculating unit 102, a surface shape detecting unit 103, a surface state detecting unit 104, an illumination state detecting unit 105, and an output image correcting unit 106.

At least one of the first to n-th cameras 101a to 101n is a range image camera such as a stereo vision, a time of fight (TOF) and structural light, and acquires a range image for a surface to project an image to provide the acquired range image to the range image calculating unit. Here, the range image is an image representing ranges for pixels in a screen as information on brightness or a color, and in FIG. 3, as a range to an object is closer, the range image is brightly represented.

The range image calculating unit 102 provides a result of calculating a range image inputted from the range image camera to the surface shape detecting unit 103.

Figure 5:
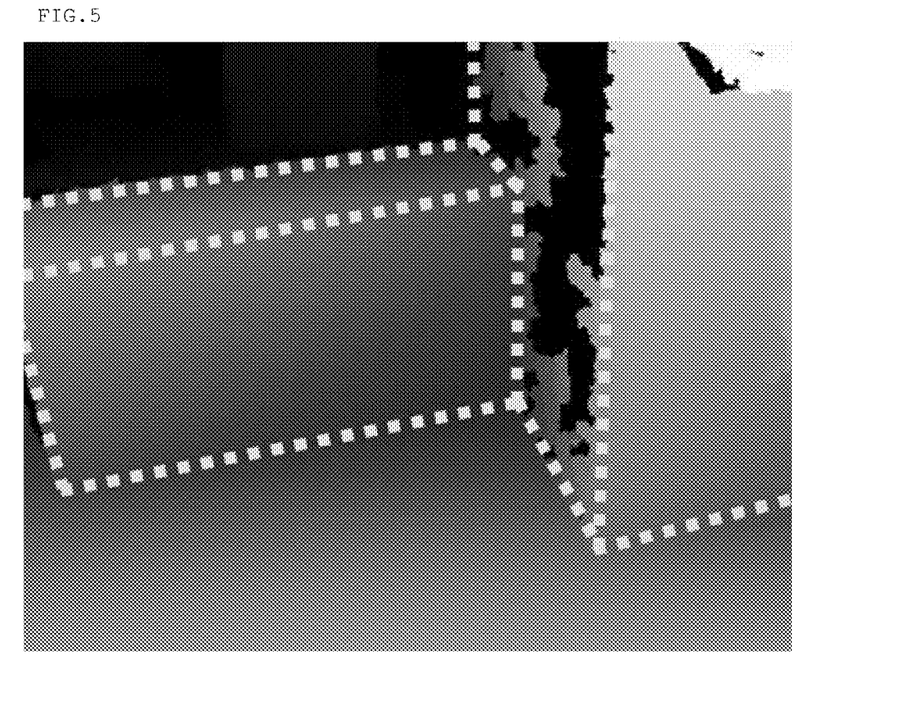
FIG. 5 is a diagram illustrating an example of a result in which a spatial structure is determined by using the range image information of FIG. 3 and as a result, a surface shape is recognized.

The surface shape detecting unit 103 acquires geometric information on a surface to be projected with the image by performing a process of recognizing the surface shape of the surface to be projected with the image as illustrated in FIG. 5 by using the calculated result inputted from the range image calculating unit 102.

Figure 6:
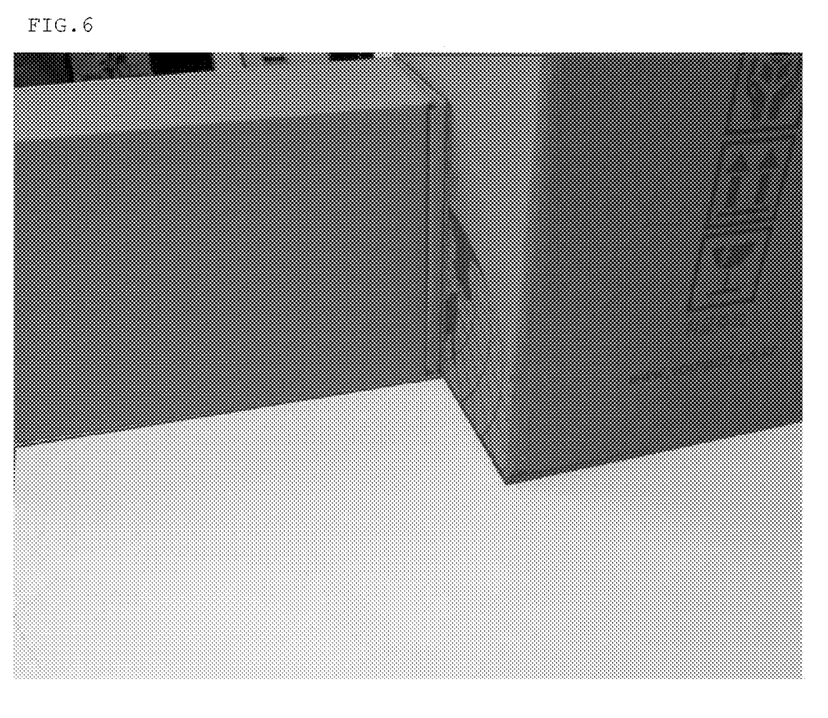
FIG. 6 is a diagram illustrating an example of a result in which a region segmentation for an arbitrary projection environment is performed by using color and material information according to the present invention.

The surface state detecting unit 104 performs a difference image between an input image and an output image inputted from at least one camera (that is, an actual image camera) of the first to n-th cameras 101a to 101n to reconfigure an independent irradiation environment image which removes a projection image component of the projector after removing an output image component of the previous screen from an image inputted from the actual image camera, region segments the screen through analyzing color and material, and acquires correction information on the surface to be projected with the image by analyzing color and material for each region, as illustrated in FIG. 6.

The illumination state detecting unit 105 acquires information on an illumination environment to be projected with the image through brightness of the image inputted from at least one actual image camera and a gain value of the camera.

Figure 7:
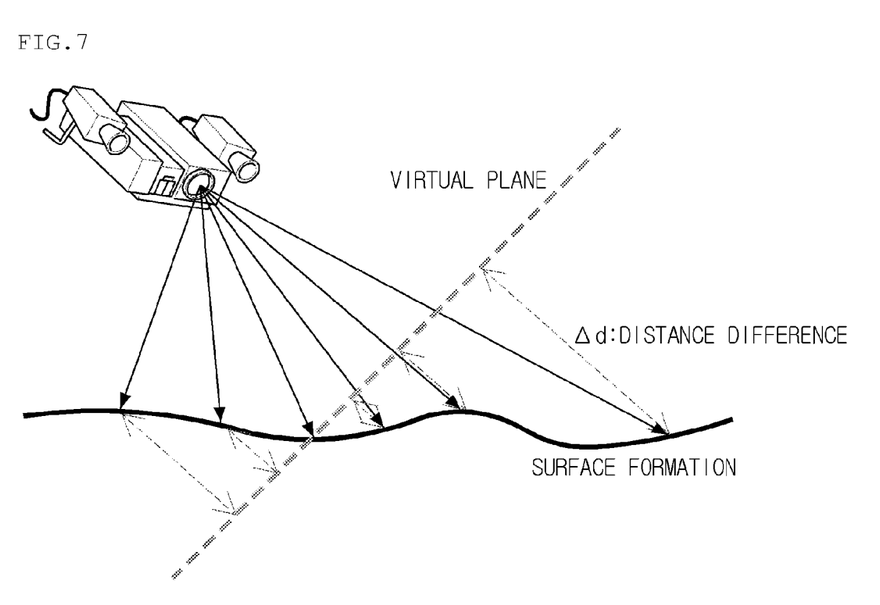
FIG. 7 is a diagram illustrating a geometrical image correction method for a surface shape according to the present invention.

The output image correcting unit 106 corrects the output image by using geometric correction information on the image projection surface inputted from the surface shape detecting unit 103, color and material information inputted from the surface state detecting unit 104, and illumination information inputted from the illumination state detecting unit 105. First, as illustrated in FIG. 7, after a virtual plane for the projector is set and a distance difference Δd for the surface shape is obtained, the geometric correction for the surface shape is performed so that the output image is normalized through linear transform of the output image for the distance difference. Next, as illustrated in FIG. 6, with respect to the color and material information, the output image is normalized by controlling an RGB gain, brightness, and a contrast gain for each region by using region segmented information. Finally, with respect to the illumination information, the RGB gain, the brightness, and the contrast gain for the entire region of the screen are controlled. As described above, the result corrected through the output image correcting unit is provided to the image output device.

An effect of the projector image correction device having the above-described configuration according to the present invention will be described below with reference to FIG. 8.

Figure 8:
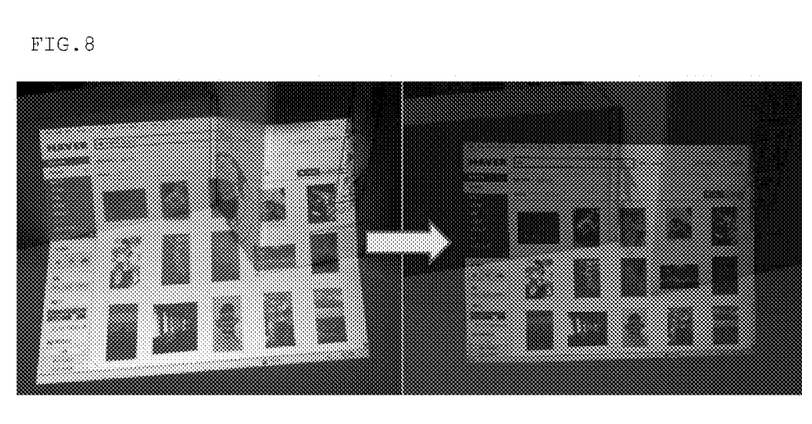
FIG. 8 is a photograph showing an example of a result in which image correction is performed and outputted in an arbitrary environment according to the present invention.

Since the projected image is influenced by the projection environment such as a shape, a color, and brightness like a left photograph of FIG. 8, image quality of a left image which is not corrected is deteriorated, but when the image correction according to the present invention is performed, the shape, the color, and the brightness are improved and thus the image quality of the image is improved like a right photograph of FIG. 8.

A method of correcting a projector image by using the projector image correction device having the above-described configuration according to the present invention will be described below.

First, at least one of the first to n-th cameras 101a to 101n acquires a range image for a surface to be projected with an image to provide the acquired range image to the range image calculating unit 102. Here, the camera is a range image camera such as a stereo vision, a time of fight (TOF), and a structural light. The range image is an image representing a range for each pixel in a screen as information on brightness, a color, or the like.

Next, the range image calculating unit 102 provides a result of calculating a range image inputted from the range image camera to the surface shape detecting unit 103.

Next, the surface shape detecting unit 103 acquires geometric information on the surface to be projected with the image by performing a process of recognizing the surface shape of the surface to be projected with the image, by using the calculated result inputted from the range image calculating unit 102.

Next, the surface state detecting unit 104 performs a difference image between an input image and an output image inputted from at least one camera (that is, an actual image camera) of the first to n-th cameras 101a to 101n to reconfigure an independent irradiation environment image which removes a projection image component of the projector after removing an output image component of the previous screen from an image inputted from the actual image camera, region-segments the screen through analysis for color and material, and acquires correction information on the surface to be projected with the image by analyzing color and material for each region.

Next, the illumination state detecting unit 105 acquires information on an illumination environment to be projected with an image through brightness of the image inputted from the actual image camera and a gain value of the camera.

Next, the output image correcting unit 106 corrects the output image by using geometric correction information on the image projection surface inputted from the surface shape detecting unit 103, color and material information inputted from the surface state detecting unit 104, and illumination information inputted from the illumination state detecting unit 105. First, after a virtual plane for the projector is set and a distance difference Ad for the surface shape is obtained, the geometric correction for the surface shape is performed so that the output image is normalized through linear transform of the output image for the distance difference. Next, as illustrated in FIG. 6, with respect to the color and material information, the output image is normalized by controlling an RGB gain, brightness, and a contrast gain for each region by using region segmented information. Finally, with respect to the illumination information, the RGB gain, the brightness, and the contrast gain for the entire region of the screen are controlled.

Next, the output image correcting unit 106 provides the corrected result to the image output device.

According the present invention having the above-described configuration and method, it is possible to output a projector image without distortion even in any environment having various colors and materials.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A projector image correction device, comprising:
   at least one range image camera acquiring a range image for a surface to project an image;
   an actual image camera photographing the surface to project the image;
   a range image calculating unit outputting a result of calculating the range image inputted from the range image camera;
   a surface shape detecting unit acquiring geometric information on an surface to be projected with the image by recognizing the surface shape of the surface to be projected with the image by using the calculated result inputted from the range image calculating unit;
   a surface state detecting unit reconfiguring an independent irradiation environment image acquired by removing a projection image component of the projector by removing an output image component of the previous screen from the image inputted from the actual image camera to divide the screen for each region through analyzing color and material and analyzing color and material for each region to acquire color and material information;
   an illumination state detecting unit acquires illumination information of an environment through brightness of the input image inputted from the actual image camera and a gain value of the actual image camera; and
   an output image correcting unit correcting the output image by using the geometric information, color and material information, and illumination information to output the corrected image.

2. The projector image correction device of claim 1, wherein:
   the range image is an image representing a range for each pixel in a screen as information including brightness or a color.

3. The projector image correction device of claim 1, wherein:
   the surface state detecting unit performs a difference image between the input image inputted from the actual image camera and an output image in order to remove the output image component of the previous screen from the image inputted from the actual image camera.

4. The projector image correction device of claim 1, wherein:
   the output image correcting unit sets a virtual plane for the projector and acquires a distance difference for the surface shape, and thereafter, normalizes the output image through linear transform of the output image for the distance difference in geometric correction for the surface shape.

5. The projector image correction device of claim 1, wherein:
   the output image correcting unit normalizes the output image by controlling an RGB gain, brightness, and a contrast gain for each region by using region segmented information.

6. The projector image correction device of claim 1, wherein:
   the output image correcting unit controls the RGB gain, the brightness, and the contrast gain for the entire region of the screen.

7. A projector image correction method, comprising:
   acquiring a range image for a surface to project an image;
   acquiring an input image by photographing the surface to project the image;
   outputting a result of calculating the range image inputted from the range image camera;
   acquiring geometric information on an surface to be projected with the image by recognizing the surface shape of the surface to be projected with the image by using the calculated result;
   reconfiguring an independent irradiation environment image acquired by removing a projection image component of the projector by removing an output image component of the previous screen from the input image to divide the screen for each region through analyzing color and material and analyzing color and material for each region to acquire color and material information;
   acquiring illumination information of an environment through brightness of the input image inputted from the actual image camera and a gain value of the actual image camera; and correcting the output image by using the geometric information, color and material information, and illumination information to output the corrected image.

8. The projector image correction method of claim 7, wherein:
the range image is an image representing a range for each pixel in a screen as information including brightness or a color.

9. The projector image correction method of claim 7, wherein:
a difference image between the input image and the output image is performed in order to remove the output image component of the previous screen from the input image.

10. The projector image correction method of claim 7, wherein:
in the correcting the output image by using the geometric information, color and material information, and illumination information to output the corrected image, a virtual plane is set for the projector and a distance difference for the surface shape is acquired, and thereafter, the output image is normalized through linear transform of the output image for the distance difference in geometric correction of the surface shape.

11. The projector image correction method of claim 7, wherein:
in the correcting the output image by using the geometric information, color and material information, and illumination information to output the corrected image, the output image is normalized by controlling an RGB gain, brightness, and a contrast gain for each region by using region segmented information.

12. The projector image correction method of claim 7, wherein:
in the correcting the output image by using the geometric information, color and material information, and illumination information to output the corrected image, the RGB gain, the brightness, and the contrast gain for the entire region of the screen are controlled.

* * * * *